US011506959B2

(12) United States Patent
Chen et al.

(10) Patent No.: US 11,506,959 B2
(45) Date of Patent: Nov. 22, 2022

(54) OPTICAL ELEMENT ADJUSTING MECHANISM, OPTICAL ELEMENT ADJUSTING SYSTEM, AND PROJECTION DEVICE

(71) Applicant: Coretronic Corporation, Hsin-Chu (TW)

(72) Inventors: Wei-Hao Chen, Hsin-Chu (TW); Ken-Teng Peng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/477,497

(22) Filed: Sep. 16, 2021

(65) Prior Publication Data
US 2022/0137492 A1    May 5, 2022

(30) Foreign Application Priority Data
Oct. 29, 2020   (CN) .......................... 202022452685.7

(51) Int. Cl.
| G03B 21/14 | (2006.01) |
| G02B 26/08 | (2006.01) |
| G03B 21/20 | (2006.01) |
| G02B 7/182 | (2021.01) |

(52) U.S. Cl.
CPC .......... *G03B 21/142* (2013.01); *G02B 7/182* (2013.01); *G02B 26/0816* (2013.01); *G03B 21/2066* (2013.01)

(58) Field of Classification Search
CPC ...... G03B 21/00; G03B 21/14; G03B 21/142; G03B 21/2066; G02B 26/0816; G02B 7/182; G02B 7/18
See application file for complete search history.

(56) References Cited

U.S. PATENT DOCUMENTS

| 11,194,241 B2* | 12/2021 | Chen ..................... G03B 21/142 |
| 11,269,242 B2* | 3/2022 | Hsu ....................... G03B 21/145 |
| 2013/0107379 A1* | 5/2013 | Lee ........................ G02B 7/023 |
| | | 359/811 |
| 2021/0294188 A1* | 9/2021 | Hsu ........................ G02B 7/004 |
| 2022/0066298 A1* | 3/2022 | Tso ....................... G03B 21/142 |

FOREIGN PATENT DOCUMENTS

| TW | 201907219 | 2/2019 |
| TW | 201928427 | 7/2019 |

* cited by examiner

*Primary Examiner* — William C. Dowling
(74) *Attorney, Agent, or Firm* — JCIPRNET (57) ABSTRACT

An optical element adjusting mechanism is provided, including a frame, a carrier, and an optical element. The frame includes a plurality of first positioning portions. The carrier includes a hollow body, a first axial portion connected to the hollow body, and a plurality of second positioning portions connected to the hollow body. The hollow body is connected to the frame through the first axial portion. The plurality of second positioning portions are disposed corresponding to the plurality of first positioning portions. The optical element is fixed on the hollow body. The plurality of second positioning portions are fixed to the plurality of first positioning portions through a plurality of adhesives. An optical element adjusting system and a projection device are also proposed. The optical element adjusting mechanism, the optical element adjusting system, and the projection device quickly, easily, and accurately adjust a rotation angle of the optical element.

10 Claims, 9 Drawing Sheets

OPTICAL ELEMENT ADJUSTING MECHANISM, OPTICAL ELEMENT ADJUSTING SYSTEM, AND PROJECTION DEVICE

CROSS-REFERENCE TO RELATED APPLICATION

This application claims the priority benefit of China application serial no. 202022452685.7, filed on Oct. 29, 2020. The entirety of the above-mentioned patent application is hereby incorporated by reference herein and made a part of this specification.

BACKGROUND

Technical Field

The disclosure relates to an adjusting mechanism, an adjusting system, and a projection device; particularly, the disclosure relates to an optical element adjusting mechanism, an optical element adjusting system, and a projection device.

Description of Related Art

Generally speaking, in order to optimize the brightness of light beams emitted by devices (e.g., a projector) having an optical engine, assemblers will confirm a mounting angle of optical elements in the optical engine before shipment. However, how to quickly, easily, and accurately adjust the mounting angle of the optical element and reliably fix the mounting angle of the optical element after the adjustment has been an issue constantly explored by relevant manufacturers.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art. cl SUMMARY The disclosure provides an optical element adjusting mechanism and an optical element adjusting system, which quickly, easily, and accurately adjust the angle of the optical element, and reliably fix the angle of the optical element after the adjustment.

The disclosure provides a projection device having the above-mentioned optical element adjusting mechanism.

Other purposes and advantages of the disclosure can be further understood from the disclosed technical features in the disclosure.

In order to achieve one, some, or all of the above objectives or other objectives, the disclosure provides an optical element adjusting mechanism, which includes a frame, a carrier, and an optical element. The frame includes a plurality of first positioning portions. The carrier includes a hollow body, a first axial portion connected to the hollow body, and a plurality of second positioning portions connected to the hollow body. The hollow body is connected to the frame through the first axial portion. The plurality of second positioning portions are disposed corresponding to the plurality of first positioning portions. The optical element is fixed on the hollow body. The plurality of second positioning portions are fixed to the plurality of first positioning portions through a plurality of adhesives.

In order to achieve one, some, or all of the above objectives or other objectives, the disclosure provides an optical element adjusting system, which includes a frame, a carrier, an optical element, and a driving element. The frame includes a plurality of first positioning portions. The carrier includes a hollow body, a first axial portion connected to the hollow body, and a plurality of second positioning portions connected to the hollow body. The hollow body is connected to the frame through the first axial portion. The plurality of second positioning portions are disposed corresponding to the plurality of first positioning portions. The optical element is fixed on the hollow body. The driving element includes a driving coil module and a magnet. The driving coil module is detachably disposed on the frame, and the magnet is detachably disposed on the hollow body.

In order to achieve one, some, or all of the above objectives or other objectives, the disclosure provides a projection device, which includes a light source, an optical element adjusting mechanism, a light valve, and a projection lens. The light source is configured to provide an illumination light beam. The optical element adjusting mechanism is disposed on a transmission path of the illumination light beam. The optical element adjusting mechanism includes a frame, a carrier, and an optical element. The frame includes a plurality of first positioning portions. The carrier includes a hollow body, a first axial portion connected to the hollow body, and a plurality of second positioning portions connected to the hollow body. The hollow body is connected to the frame through the first axial portion. The plurality of second positioning portions are disposed corresponding to the plurality of first positioning portions. The optical element is fixed on the hollow body. The plurality of second positioning portions are fixed to the plurality of first positioning portions through a plurality of adhesives. The light valve is disposed on the transmission path of the illumination light beam and is configured to convert the illumination light beam into an image light beam. The projection lens is disposed on a path of the image light beam, and is configured to convert the image light beam into a projection light beam.

Based on the foregoing, the embodiment of the disclosure has at least one of the following advantages or effects. In the optical element adjusting mechanism according to an embodiment of the disclosure, the optical element is fixed on the hollow body of the carrier. Therefore, the assembler adjusts the angle of the optical element synchronously with adjusting the deflection angle of the hollow body relative to the frame. After the adjustment of the angle of the optical element, the second positioning portion of the carrier and the first positioning portion of the frame are glued and fixed through the adhesive to prevent the hollow body and the optical element fixed thereon from unintended deflection relative to the frame.

In the optical element adjusting mechanism or the optical element adjusting system according to an embodiment of the disclosure, the driving coil module is disposed on the frame, and the magnet is disposed on the hollow body. Therefore, through energizing the driving coil module to generate a magnetic force toward the magnet, the hollow body is acted on by the magnetic force and rotates relative to the frame, so that the deflection angle of the hollow body relative to the frame is adjusted, and the angle of the optical elements is synchronously adjusted. In an embodiment, after the adjustment of the angle of the optical elements, the assembler may detach the driving coil module from the frame, and may detach the magnet from the hollow body.

Further to the foregoing, the optical element adjusting mechanism and the optical element adjusting system according to an embodiment of the disclosure not only quickly, easily, and accurately adjust the angle of the optical element, but also reliably fix the angle of the optical element after the adjustment. On the other hand, the projection device according to an embodiment of the disclosure includes the optical element adjusting mechanism. Since the brightness of the image light beam is adjusted through the optical element adjusting mechanism, the projection device provides good projection quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
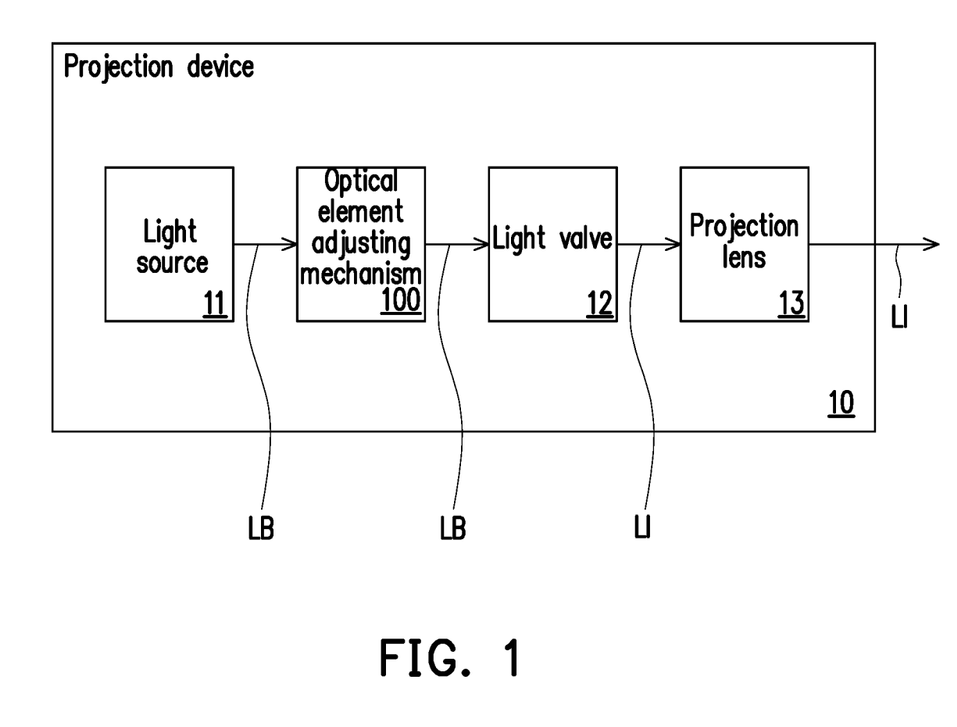
FIG. 1 is a schematic diagram of a projection device according to an embodiment of the disclosure.

FIG. 1 is a schematic diagram of a projection device according to an embodiment of the disclosure. With reference to FIG. 1, in this embodiment, a projection device 10 includes a light source 11, an optical element adjusting mechanism 100, a light valve 12, and a projection lens 13. The light source 11 is configured to provide an illumination light beam LB. The optical element adjusting mechanism 100 is disposed on a transmission path of the illumination light beam LB and is configured to adjust the transmission direction (or angle) of the illumination light beam LB. The light valve 12 is disposed on the transmission path of the illumination light beam LB and is configured to convert the illumination light beam LB into an image light beam LI. The projection lens 13 is disposed on a transmission path of the image light beam LI, and is configured to project the image light beam LI out of the projection device 10 onto a projection target (not shown), such as a screen or a wall. Since the illumination light beam LB has been adjusted by the optical element adjusting mechanism 100, the projection device 10 provides good projection quality.

The light source 11 is configured to provide the illumination light beam LB. For example, the light source 11 may be composed of a plurality of light-emitting elements, wavelength conversion elements, light uniforming elements, light filter elements, and a plurality of light splitting and combining elements, and configured to provide light having different wavelengths as an image light source. Nonetheless, the type or the form of the light source 11 in the projection device 10 is not limited by the disclosure. For the specific structure and implementation thereof, sufficient teaching, suggestions, and implementation instructions can be obtained from common knowledge in the technical field, and will therefore not be repeatedly described.

The light valve 12 is, for example, a reflective light modulator such as a liquid crystal on silicon panel (LCoS panel), a digital micro-mirror device (DMD), or the like. In some embodiments, the light valve 12 may also be a transmissive light modulator such as a transparent liquid crystal panel, an electro-optical modulator, a magneto-optic modulator, an acousto-optic modulator (AOM), or the like. The form and the type of the light valve 12 are not limited by the disclosure. For the method by which the light valve 12 converts the illumination light beam LB into the image light beam LI, and the detailed steps and implementation thereof, sufficient teaching, suggestions, and implementation instructions can be obtained from common knowledge in the technical field, and will therefore not be repeatedly described. In this embodiment, the number of light valve 12 is one, for example, the projection device 10 using a single digital micro-mirror device. Nonetheless, in other embodiments, the number may be plural, and the disclosure is not limited thereto.

The projection lens 13 includes, for example, one or a combination of multiple optical lenses having refractive power, such as various combinations of non-planar lenses including biconcave lenses, biconvex lenses, concave-convex lenses, convex-concave lenses, plano-convex lenses, and plano-concave lenses. In an embodiment, the projection lens 13 may also include a planar optical lens and project the image light beam LI from the light valve 12 onto the projection target in a reflective manner. The form and the type of the projection lens 13 are not limited by the disclosure.

Figure 2A:
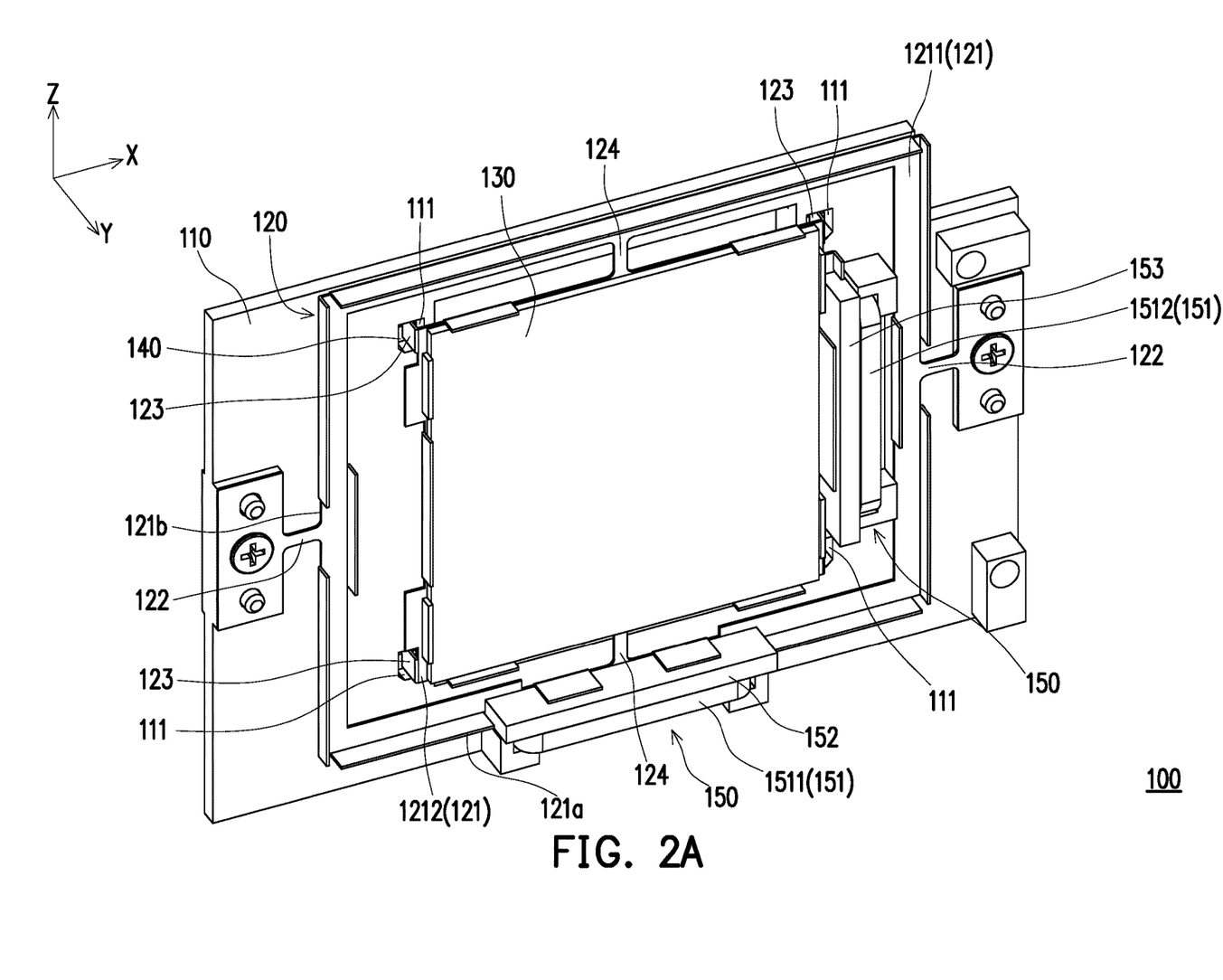
FIG. 2A is a schematic diagram of an optical element adjusting mechanism according to an embodiment of the disclosure.
Figure 2B:
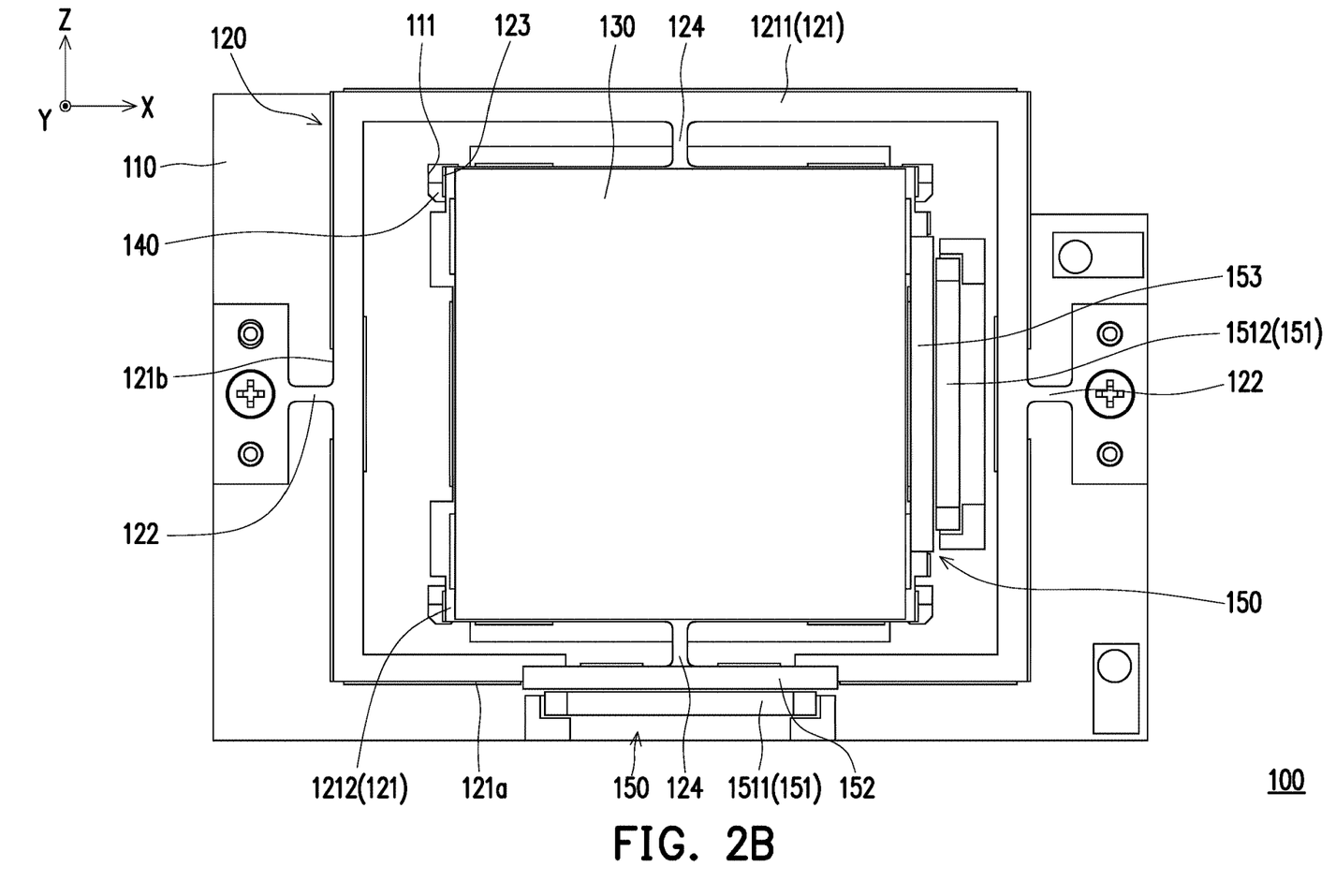
FIG. 2B is a schematic front view of the optical element adjusting mechanism of FIG. 2A.
Figure 2C:
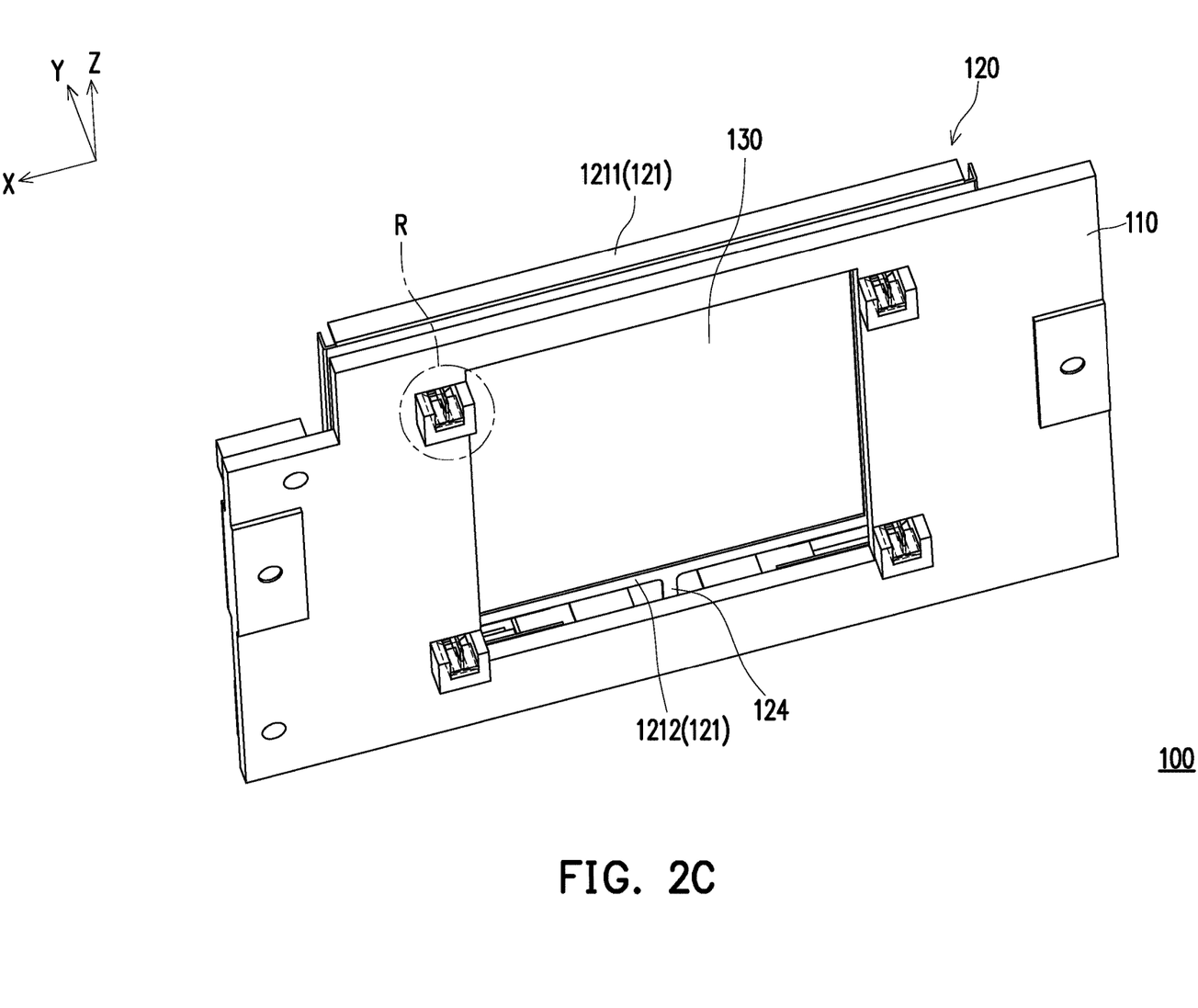
FIG. 2C is a schematic diagram of the optical element adjusting mechanism of FIG. 2A from another view angle.
Figure 2D:
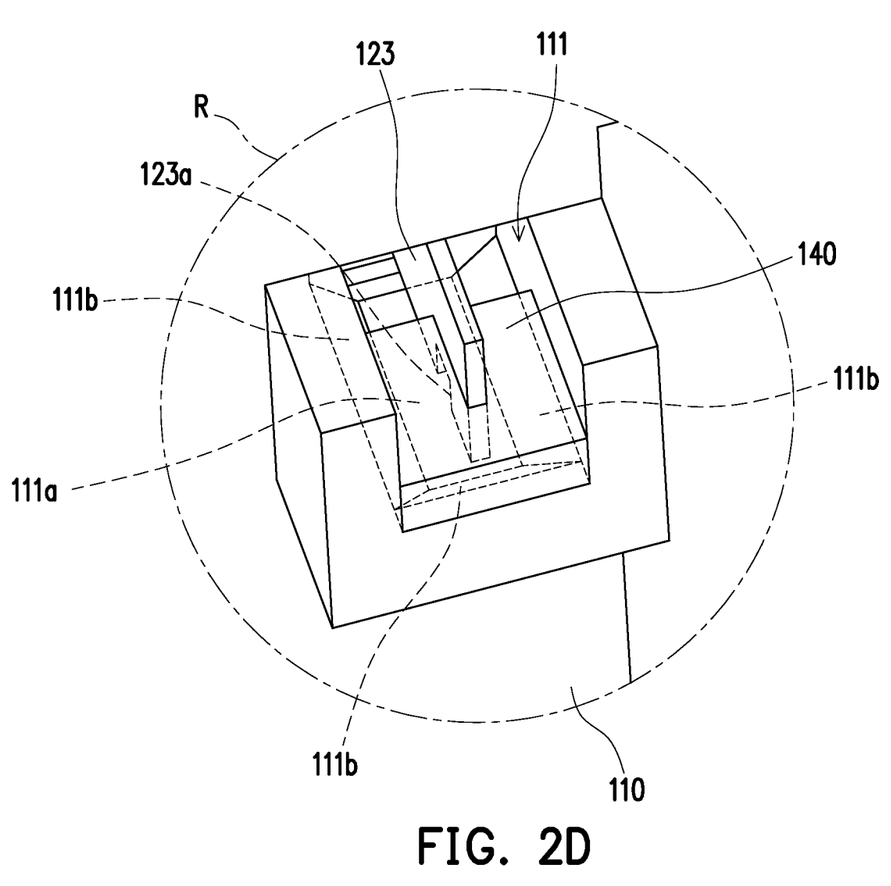
FIG. 2D is a schematic enlarged diagram of region R of FIG. 2C.

FIG. 2A is a schematic diagram of an optical element adjusting mechanism according to an embodiment of the disclosure. FIG. 2B is a schematic front view of the optical element adjusting mechanism of FIG. 2A. FIG. 2C is a schematic diagram of the optical element adjusting mechanism of FIG. 2A from another view angle. FIG. 2D is a schematic enlarged diagram of region R of FIG. 2C. With reference to FIG. 2A to FIG. 2C, in this embodiment, the optical element adjusting mechanism 100 includes a frame 110, a carrier 120, and an optical element 130. The carrier 120 is connected to the frame 110, and the optical element 130 is fixed on the carrier 120.

To be specific, the frame 110 may be a hollow frame and includes a plurality of first positioning portions 111. The carrier 120 includes a hollow body 121, a first axial portion 122, and a plurality of second positioning portions 123. The first axial portion 122 and the plurality of second positioning portions 123 are connected to the hollow body 121. The first axial portion 122, for example, includes two first axial portions. In addition, the first axial portion 122 and the plurality of second positioning portions 123 extend outward from the hollow body 121. However, an extending direction of the first axial portion 122 is, for example, different from an extending direction of the second positioning portions 123. The hollow body 121 is connected to the frame 110 through the first axial portion 122, and the plurality of second positioning portions 123 are disposed corresponding to the plurality of first positioning portions 111.

As shown in FIG. 2A to FIG. 2C, the optical element 130 is fixed on the hollow body 121. The frame 110 may selectively have an opening, and the optical element 130 is disposed corresponding to the opening. On the other hand, the plurality of first positioning portions 111 are distributed on the periphery of the opening. As shown in FIG. 2C and FIG. 2D, the plurality of second positioning portions 123 are fixed to the plurality of first positioning portions 111 through a plurality of adhesives 140. That is, the hollow body 121 is connected to the frame 110 through the plurality of second positioning portions 123 and the plurality of adhesives 140.

In this embodiment, the plurality of first positioning portions 111 may be a plurality of slots, and the plurality of second positioning portions 123 may be a plurality of convex portions which fit the plurality of slots. The plurality of convex portions (i.e., the plurality of second positioning portions 123) are inserted into the plurality of slots (i.e., the plurality of first positioning portions 111), the plurality of adhesives 140 are filled in the plurality of slots (i.e., the plurality of first positioning portions 111) and wrap the plurality of convex portions (i.e., the plurality of second positioning portions 123). That is to say, the plurality of slots (i.e., the plurality of first positioning portions 111) are configured to accommodate the plurality of convex portions (i.e., the plurality of second positioning portions 123) and the plurality of adhesives 140. The plurality of convex portions (i.e., the plurality of second positioning portions 123) are glued and fixed in the plurality of slots (i.e., the plurality of first positioning portions 111) through the plurality of adhesives 140, to fix the relative position of the hollow body 121 and the frame 110.

In other embodiments, the plurality of first positioning portions 111 may be a plurality of convex portions, and the plurality of second positioning portions 123 may be a plurality of slots which fit the plurality of convex portions.

With reference to FIG. 2A and FIG. 2B, in this embodiment, the optical element 130 is, for example, a mirror or a beam splitter. Nonetheless, the type of the optical element 130 is not limited thereto. Specifically, before the plurality of convex portions (i.e., the plurality of second positioning portions 123) are glued and fixed in the plurality of slots (i.e., the plurality of first positioning portions 111) through the plurality of adhesives 140, the hollow body 121 can rotate relative to the frame 110 through the first axial portion 122, and the optical element 130 rotates synchronously with the hollow body 121.

That is to say, through adjusting a deflection angle of the hollow body 121 relative to the frame 110, an assembler may synchronously adjust an angle of the optical element 130. After the adjustment of the angle of the optical element 130, the plurality of second positioning portions 123 are glued and fixed in the plurality of first positioning portions 111 through the plurality of adhesives 140 to accordingly fix the deflection angle of the hollow body 121 relative to the frame 110, namely the angle of the optical element 130 fixed on the hollow body 121, and prevent the hollow body 121 and the optical element 130 fixed thereon from unintended deflection relative to the frame 110.

Therefore, the optical element adjusting mechanism 100 not only quickly, easily, and accurately adjusts the angle of the optical element 130, but also reliably fixes the angle of the optical element 130 after the adjustment. Furthermore, since the illumination light beam LB has been adjusted through the adjusting mechanism of the optical element 130, the brightness of the image light beam LI is appropriately adjusted, and the projection device 10 provides good projection quality, as shown in FIG. 1 and FIG. 2A.

With reference to FIG. 2A and FIG. 2B again, in this embodiment, the optical element adjusting mechanism 100 also includes a driving element 150. The driving element 150 is, for example, fixed to the optical element adjusting mechanism 100 or detachably disposed on the optical element adjusting mechanism 100. The driving element 150 includes a driving coil module 151 and magnets 152 and 153. The driving coil module 151 is disposed on the frame 110. The magnets 152 and 153 are disposed on the hollow body 121 and located on the periphery of the optical element 130. The number of driving coil modules 151 may be increased depending on actual design requirements, and the number of magnets 152 and 153 may be increased or decreased depending on actual design requirements, and are not limited by the disclosure.

In this embodiment, the driving coil module 151 includes coils 1511 and 1512 respectively disposed corresponding to the magnets 152 and 153. In addition, the coils 1511 and 1512 and the magnets 152 and 153 are disposed in a one-to-one correspondence. Before the plurality of second positioning portions 123 are glued and fixed in the plurality of first positioning portions 111 through the plurality of adhesives 140, the coil 1511 (or the coil 1512) may be energized to generate a magnetic force (e.g., an attractive force or a repulsive force) toward the corresponding magnet 152 (or the magnet 153), so that the hollow body 121 is acted on by the magnetic force and rotates relative to the frame 110 around the first axial portion 122. Accordingly, the deflection angle of the hollow body 121 relative to the frame 110 is adjusted and the angle of the optical element 130 is synchronously adjusted, not only reducing the process of manually adjusting the optical element 130 by the assembler, but also greatly increasing the efficiency and the accuracy of adjusting the angle of the optical element 130.

With reference to FIG. 2C and FIG. 2D, in this embodiment, each slot (i.e. the first positioning portion 111) has a bottom surface 111a and an inclined surface 111b connected to the bottom surface 111a. In addition, each adhesive 140 covers the bottom surface 111a and (part of) the inclined surface 111b of the corresponding slot (i.e., the first positioning portion 111). Based on the inner profile design of the slot (i.e. the first positioning portion 111), the adhesive 140 is filled in the slot (i.e. the first positioning portion 111) more easily, not only facilitating the dispensing operation, but also increasing the bonding area between the adhesive 140 and the slot (i.e., the first positioning portion 111).

On the other hand, each convex portion (i.e., the second positioning portion 123) has a recess 123a facing the bottom surface 111a of the corresponding slot (i.e., the first positioning portion 111). Each adhesive 140 wraps (part of) the corresponding convex portion (i.e., the second positioning portion 123), and is filled in the recess 123a. Accordingly, between the adhesive 140 and the convex portion (i.e., the second positioning portion 123), the bonding area and the extent of engagement are greatly increased, to more securely fix each convex portion (i.e., the second positioning portion 123) in the corresponding slot (i.e., the first positioning portion 111).

Furthermore, with reference to FIG. 2A and FIG. 2B, in this embodiment, the hollow body 121 includes a first hollow frame portion 1211, a second hollow frame portion 1212, and a second axial portion 124. The optical element 130 is fixed on the second hollow frame portion 1212, and the first hollow frame portion 1211 surrounds the second hollow frame portion 1212. The second hollow frame portion 1212 is connected to the first hollow frame portion 1211 through the second axial portion 124. The second axial portion 124, for example, includes two second axial portions, and the first hollow frame portion 1211 is connected to the frame 110 through the first axial portion 122. On the other hand, the plurality of second positioning portions 123 protrude from the corners of the second hollow frame portion 1212. Notably, the optical element 130 is disposed corresponding to the opening of the frame 110; that is, the opening region of the frame 110 may include a position of the second hollow frame portion 1212, and may selectively include or exclude a position of the first hollow frame portion 1211. Namely, it is possible that the frame 110 instead of the opening is present below the first hollow frame portion 1211. In this way, in a direction parallel to a normal of the optical element 130, a gap is present between the frame 110 and the hollow body 121 to provide a rotation space for the hollow body 121. Nonetheless, the disclosure is not limited thereto. In other embodiments, the opening area of the frame 110 may cover the position of the first hollow frame portion 1211. In this way, it is possible that in the direction parallel to the normal of the optical element 130, a gap is absent between the frame 110 and the hollow body 121.

In this embodiment, the first axial portion 122 extends outward from two opposite sides of the first hollow frame portion 1211 and is connected to the frame 110. The magnet 152 and the coil 1511 are disposed corresponding to the first axial portion 122, and a force arm is formed between the first axial portion 122 and the magnet 152. When the coil 1511 is energized, the coil 1511 generates a magnetic force (e.g., an attractive force or a repulsive force) toward the magnet 152, so that the first hollow frame portion 1211 is acted on by the magnetic force and rotates relative to the frame 110 around the first axial portion 122. When the first hollow frame portion 1211 rotates relative to the frame 110 through the first axial portion 122, the second hollow frame portion 1212 and the optical element 130 fixed thereon rotate synchronously with the first hollow frame portion 1211.

The second axial portion 124 extends outward from two opposite sides of the second hollow frame portion 1212 and is connected to the first hollow frame portion 1211. An extending direction of the second axial portion 124 is not parallel to the extending direction of the first axial portion 122, and the extending directions are, for example, perpendicular to each other. The magnet 153 and the coil 1512 are disposed corresponding to the second axial portion 124. The magnet 153 and the coil 1512 are located between the first hollow frame portion 1211 and the second hollow frame portion 1212, and a force arm is formed between the second axial portion 124 and the magnet 153. When the coil 1512 is energized, the coil 1512 generates a magnetic force (e.g., an attractive force or a repulsive force) toward the magnet 153, so that the second hollow frame portion 1212 is acted on by the magnetic force and rotates relative to the first hollow frame portion 1211 around the second axial portion 124. When the second hollow frame portion 1212 rotates relative to the first hollow frame portion 1211 through the second axial portion 124, the optical element 130 rotates synchronously with the second hollow frame portion 1212. At this time, the first hollow frame portion 1211 is fixed, so the second hollow frame portion 1212 may be regarded as rotating relative to the frame 110.

That is to say, the optical element 130 may be driven by the driving element 150 to rotate around at least two perpendicular axial directions in the space. Notably, if the magnet 152 disposed corresponding to the first axial portion 122 is regarded as a first magnet, and the magnet 153 disposed corresponding to the second axial portion 124 is regarded as a second magnet, then an axis of the second axial portion 124 passes through the first magnet, and an axis of the first axial portion 122 passes through the second magnet.

To be specific, with reference to FIG. 2B, in this embodiment, the hollow body 121 has a first side surface 121a and a second side surface 121b perpendicular to the first side surface 121a. In addition, the first side surface 121a and the second side surface 121b belong to an outer side surface of the first hollow frame portion 1211. The first axial portion 122 extends outward from the second side surface 121b and is connected to the frame 110. The magnet 152 and the coil 1511 disposed corresponding to the first axial portion 122 are disposed on one side of the first side surface 121a, and the magnet 152 is disposed on the first side surface 121a.

Figure 3A:
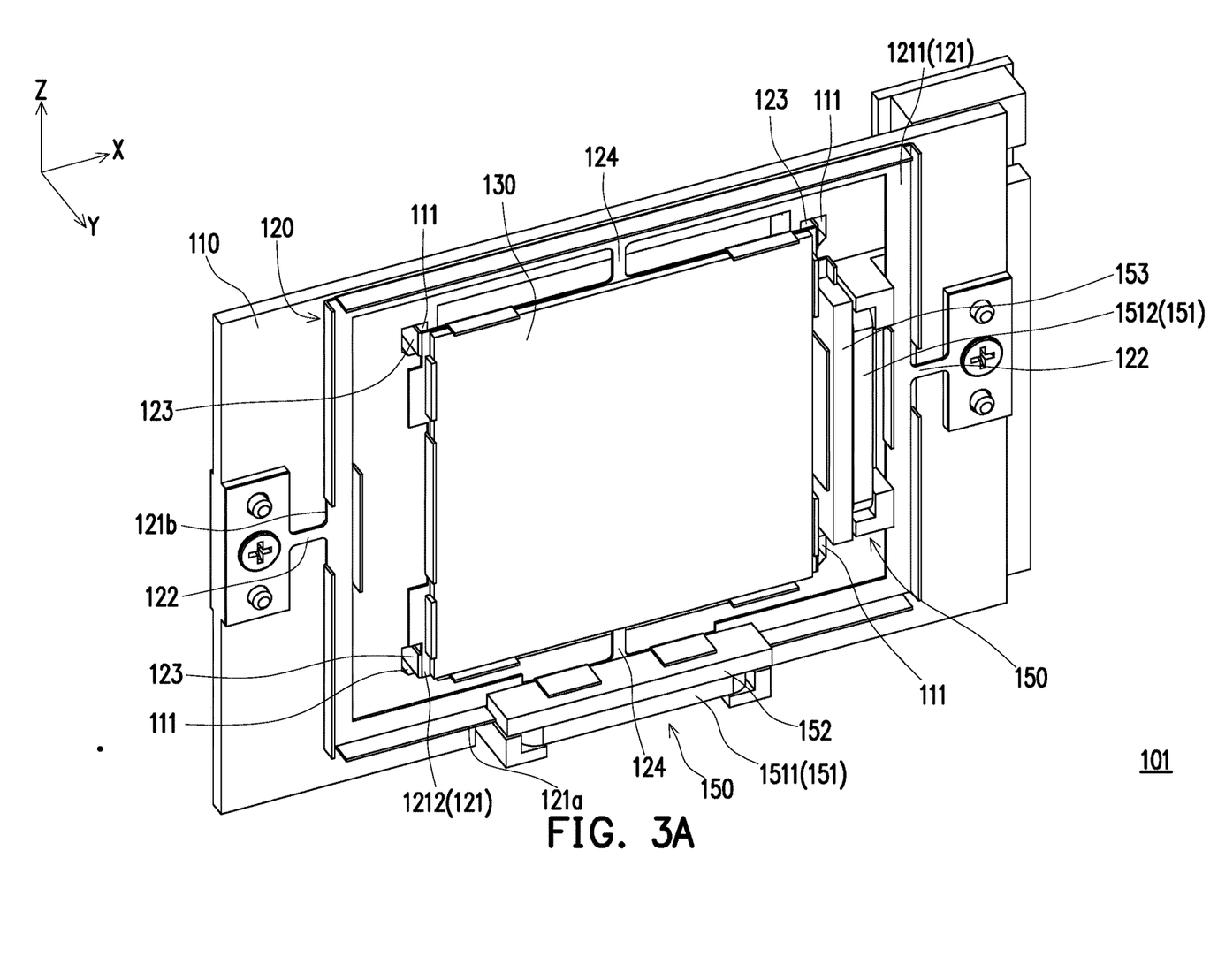
FIG. 3A is a schematic diagram of an optical element adjusting system according to an embodiment of the disclosure.
Figure 3B:
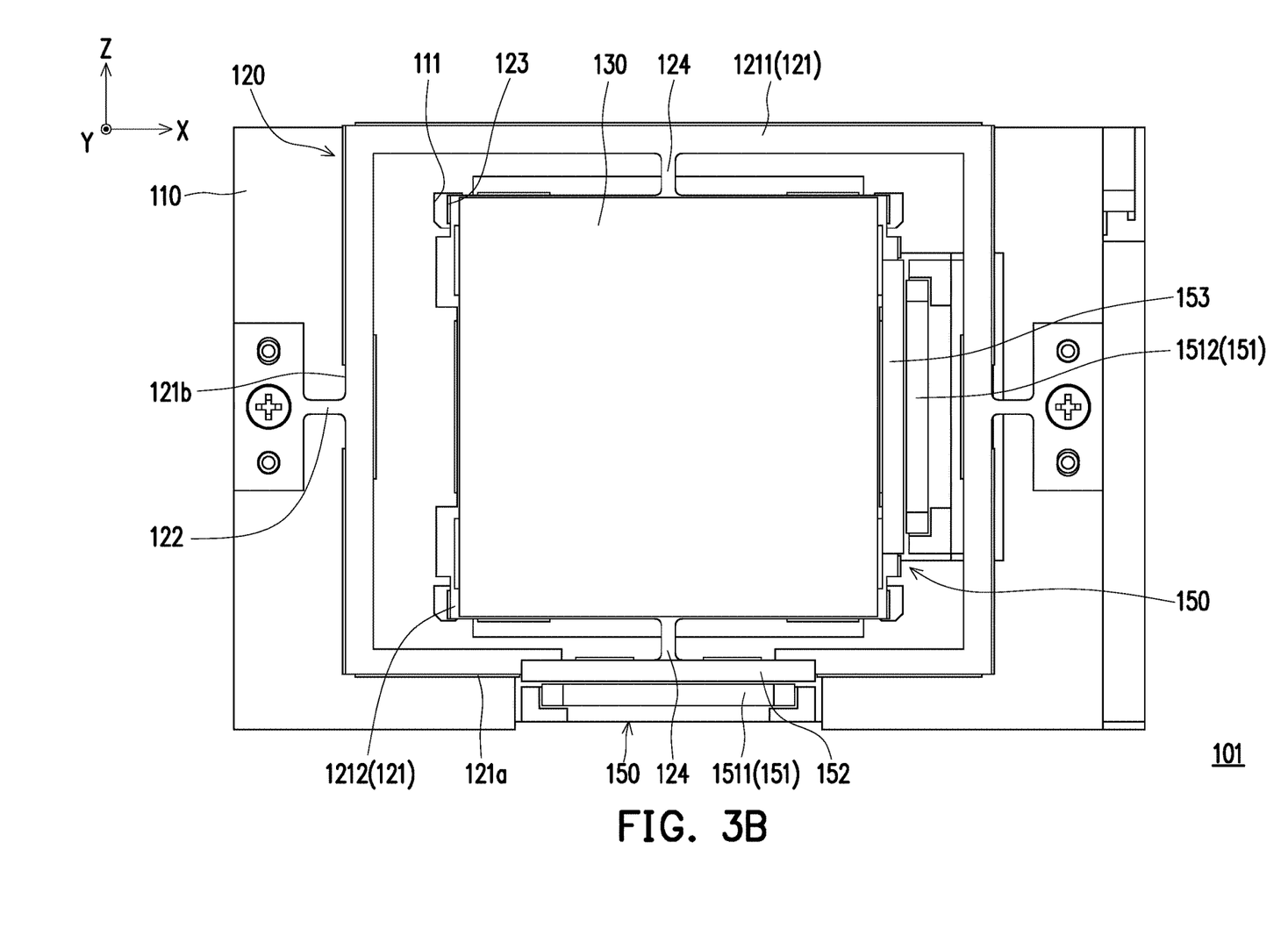
FIG. 3B is a schematic front view of the optical element adjusting system of FIG. 3A.
Figure 3C:
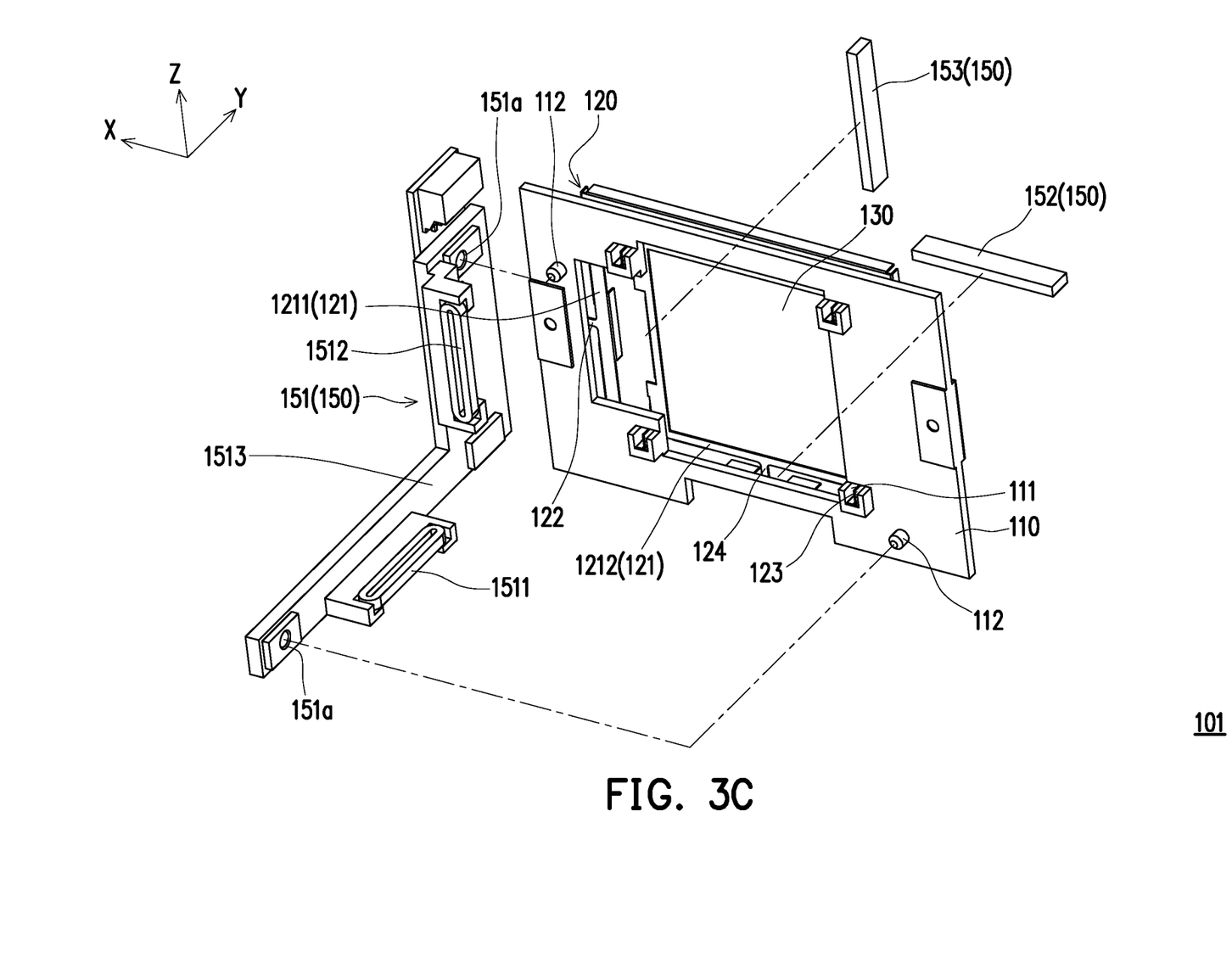
FIG. 3C is a schematic exploded view of the optical element adjusting system of FIG. 3A.

FIG. 3A is a schematic diagram of an optical element adjusting system according to an embodiment of the disclosure. FIG. 3B is a schematic front view of the optical element adjusting system of FIG. 3A. FIG. 3C is a schematic exploded view of the optical element adjusting system of FIG. 3A. With reference to FIG. 3A to FIG. 3C, an optical element adjusting system 101 includes an optical element adjusting mechanism 100A and the driving element 150, and is configured to adjust the transmission direction (or angle) of the illumination light beam LB, for example. The main differences between the optical element adjusting mechanism 100A and the optical element adjusting mechanism 100 lies in that the optical element adjusting mechanism 100A of this embodiment includes the frame 110, the carrier 120, and the optical element 130, but does not include the driving element 150. Specifically, the driving element 150 of the optical element adjusting system 101 may be detached from the optical element adjusting mechanism 100A after the adjustment of the angle of the optical element 130.

Moreover, the driving coil module 151 includes the coil 1511, the coil 1512, and a carrying plate 1513 (e.g., a circuit board). The coil 1511 and the coil 1512 are disposed on the carrying plate 1513, but the disclosure is not limited thereto. In other embodiments, the driving coil module 151 may not include a carrying plate. The driving coil module 151 is detachably disposed on the frame 110, and the magnets 152 and 153 are detachably disposed on the hollow body 121. Furthermore, one of the magnets 152 and 153 is detachably disposed on the first hollow frame portion 1211, and the other of the magnets 152 and 153 is detachably disposed on the second hollow frame portion 1212. On the other hand, during the adjustment of the angle of the optical element 130, the adhesive 140 is not filled in the first positioning portion 111.

With reference to FIG. 3C, in this embodiment, the driving coil module 151 further includes a first aligning portion 151a, such as two aligning holes. The first aligning portion 151a is, for example, disposed on the carrying plate 1513, or respectively disposed on the coil 1511 and the coil 1512. On the other hand, the frame 110 further includes a second aligning portion 112, such as two aligning columns. During the assembly of the driving coil module 151 to the frame 110, through assistance and guidance by the first aligning portion 151a and the second aligning portion 112, the assembler may mount the driving coil module 151 to the correct position on the frame 110, or detach the driving coil module 151 from the frame 110.

In other embodiments, the first aligning portion 151a may be an aligning column, and the second aligning portion 112 may be an aligning hole. Alternatively, the first aligning portion 151a and the second aligning portion 112 may be a combination of aligning structures in other forms. Notably, the number of first aligning portions 151a and the number of second aligning portions 112 are not limited by the disclosure.

Figure 3D:
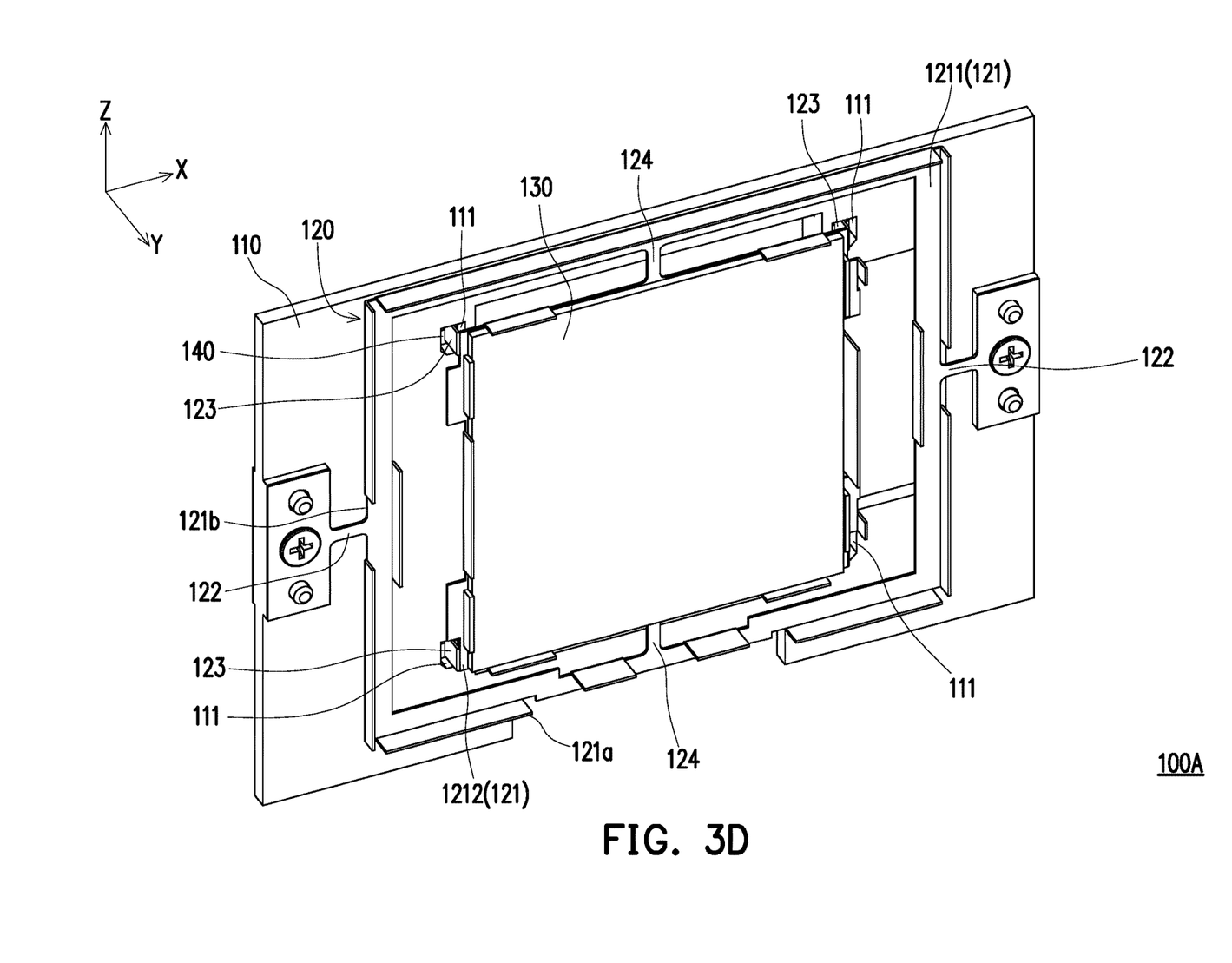
FIG. 3D is a schematic diagram of the optical element adjusting mechanism of FIG. 3A.

FIG. 3D is a schematic diagram of the optical element adjusting mechanism of FIG. 3A. With reference to FIG. 3C and FIG. 3D, after the adjustment of the angle of the optical element 130, the adhesive 140 is filled in the first positioning portion 111 to wrap and fix the second positioning portion 123, to prevent the hollow body 121 and the optical element 130 fixed thereon from unintended deflection relative to the frame 110. After filling in the adhesive 140 and fixing the deflection angle of the optical element 130, the magnets 152 and 153 are respectively detached from the first hollow frame portion 1211 and the second hollow frame portion 1212, and the driving coil module 151 is detached from the frame 110, to accordingly complete the adjustment steps of the optical element adjusting mechanism 100A.

Notably, the projection device 10 of FIG. 1 may also adopt the optical element adjusting mechanism 100A. Since the driving element 150 has been removed, the optical element adjusting mechanism 100A does not include the driving element 150. In other embodiments, the assembler may select not to detach the magnet 152 and to only detach the driving coil module 151.

On the other hand, in the optical element adjusting mechanism 100 and the optical element adjusting system 101 of the foregoing embodiments, the magnets 152 and 153 are mounted on the hollow body 121, and the driving coil module 151 is mounted on the frame 110. In other embodiments, the magnets 152 and 153 may be mounted on the frame 110, and the driving coil module 151 may be mounted on the hollow body 121.

In summary of the foregoing, the embodiment of the disclosure has at least one of the following advantages or effects. In the optical element adjusting mechanism according to an embodiment of the disclosure, the optical element is fixed on the hollow body of the carrier. Therefore, the assembler adjusts the angle of the optical element synchronously with adjusting the deflection angle of the hollow body relative to the frame. After the adjustment of the angle of the optical element, the second positioning portion of the carrier and the first positioning portion of the frame are glued and fixed through the adhesive to prevent the hollow body and the optical element fixed thereon from unintended deflection relative to the frame.

In the optical element adjusting mechanism or the optical element adjusting system according to an embodiment of the disclosure, the driving coil module is disposed on the frame, and the magnet is disposed on the hollow body. Therefore, through energizing the driving coil module to generate a magnetic force toward the magnet, the hollow body is acted on by the magnetic force and rotates relative to the frame, so that the deflection angle of the hollow body relative to the frame is adjusted, and the angle of the optical elements is synchronously adjusted. In an embodiment, after the adjustment of the angle of the optical elements, the assembler may detach the driving coil module from the frame, and may detach the magnet from the hollow body.

Further to the foregoing, the optical element adjusting mechanism and the optical element adjusting system according to an embodiment of the disclosure not only quickly, easily, and accurately adjust the angle of the optical element, but also reliably fix the angle of the optical element after the adjustment. On the other hand, the projection device according to an embodiment of the disclosure includes the optical element adjusting mechanism. Since the brightness of the image light beam is adjusted through the optical element adjusting mechanism, the projection device provides good projection quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical element adjusting mechanism, comprising a frame, a carrier, and an optical element, wherein
   the frame comprises a plurality of first positioning portions;
   the carrier comprises a hollow body, a first axial portion connected to the hollow body, and a plurality of second positioning portions connected to the hollow body, wherein the hollow body is connected to the frame through the first axial portion, and the plurality of second positioning portions are disposed corresponding to the plurality of first positioning portions; and
   the optical element is fixed on the hollow body, and the plurality of second positioning portions are fixed to the plurality of first positioning portions through a plurality of adhesives.

2. The optical element adjusting mechanism according to claim 1, wherein the plurality of first positioning portions comprises a plurality of slots, the plurality of second positioning portions comprises a plurality of convex portions, the plurality of convex portions are correspondingly inserted into the plurality of slots, and the plurality of adhesives are located in the plurality of slots and wrap the plurality of convex portions.

3. The optical element adjusting mechanism according to claim 2, wherein each of the slots has a bottom surface and an inclined surface connected to the bottom surface, and each of the adhesives covers the bottom surface and the inclined surface of the corresponding slot.

4. The optical element adjusting mechanism according to claim 3, wherein each of the convex portions has a recess facing the bottom surface of the corresponding slot, and each of the adhesives is filled in the recess of the corresponding convex portion.

5. The optical element adjusting mechanism according to claim 1, further comprising a driving element, wherein the hollow body further comprises a first side surface and a second side surface, the first side surface is perpendicular to the second side surface, the driving element is disposed on the first side surface, and the first axial portion is disposed on the second side surface.

6. The optical element adjusting mechanism according to claim 1, further comprising a driving element, wherein the driving element comprises a driving coil module and a magnet, the driving coil module is disposed on the frame, the magnet is disposed on the hollow body, and the driving coil module and the magnet are correspondingly disposed.

7. The optical element adjusting mechanism according to claim 1, wherein the hollow body comprises a first hollow frame portion, a second hollow frame portion, and a second axial portion, wherein the optical element is fixed on the second hollow frame portion, and the first hollow frame portion surrounds the second hollow frame portion, wherein the second hollow frame portion is connected to the first hollow frame portion through the second axial portion, the first hollow frame portion is connected to the frame through the first axial portion, and the first axial portion is not parallel to the second axial portion.

8. An optical element adjusting system, comprising a frame, a carrier, an optical element, and a driving element, wherein
   the frame comprises a plurality of first positioning portions;
   the carrier comprises a hollow body, a first axial portion connected to the hollow body, and a plurality of second positioning portions connected to the hollow body, wherein the hollow body is connected to the frame through the first axial portion, and the plurality of second positioning portions are disposed corresponding to the plurality of first positioning portions;
   the optical element is fixed on the hollow body; and
   the driving element comprises a driving coil module and a magnet, wherein the driving coil module is detachably disposed on the frame, and the magnet is detachably disposed on the hollow body.

9. The optical element adjusting system according to claim 8, wherein the driving coil module further comprises a first aligning portion, the frame further comprises a second aligning portion, and the driving coil module is detachably disposed on the frame through the first aligning portion and the second aligning portion.

10. A projection device, comprising a light source, an optical element adjusting mechanism, a light valve, and a projection lens, wherein
    the light source is configured to provide an illumination light beam;
    the optical element adjusting mechanism is disposed on a transmission path of the illumination light beam, and comprises a frame, a carrier, and an optical element, wherein the frame comprises a plurality of first positioning portions; the carrier comprises a hollow body, a first axial portion connected to the hollow body, and a plurality of second positioning portions connected to the hollow body, wherein the hollow body is connected to the frame through the first axial portion, and the plurality of second positioning portions are disposed corresponding to the plurality of first positioning portions; and the optical element is fixed on the hollow body, and the plurality of second positioning portions are fixed to the plurality of first positioning portions through a plurality of adhesives;
    the light valve is disposed on the transmission path of the illumination light beam and is configured to convert the illumination light beam into an image light beam; and
    the projection lens is disposed on a path of the image light beam and is configured to convert the image light beam into a projection light beam.

* * * * *